(12) United States Patent
Im et al.

(10) Patent No.: US 10,564,344 B2
(45) Date of Patent: Feb. 18, 2020

(54) DISPLAY PANEL AND METHOD OF MANUFACTURING THE SAME

(71) Applicant: Samsung Display Co., LTD., Yongin-si, Gyeonggi-Do (KR)

(72) Inventors: Hyundeok Im, Seoul (KR); Jonghyuk Kang, Suwon-si (KR); Jaebyung Park, Seoul (KR); Hyunmin Cho, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 242 days.

(21) Appl. No.: 15/066,576

(22) Filed: Mar. 10, 2016

(65) Prior Publication Data
US 2016/0327725 A1 Nov. 10, 2016

(30) Foreign Application Priority Data

May 6, 2015 (KR) .................. 10-2015-0063310

(51) Int. Cl.
*F21V 9/14* (2006.01)
*F21V 8/00* (2006.01)

(52) U.S. Cl.
CPC ......... *G02B 6/0038* (2013.01); *G02B 6/0051* (2013.01); *G02B 6/0056* (2013.01)

(58) Field of Classification Search
CPC .. G02B 5/0215; G02B 5/0252; G02B 5/0263; G02B 5/0268; G02B 5/0278; G02B 5/045; G02B 5/32; G02B 6/0043; G02B 6/0061; G02B 6/0046; G02B 6/0053; G02B 6/0038; G02B 6/0056; G02B 6/0036; G02B 6/0065; G02B 6/0071; G02B 6/0085; G02B 6/004; G02B 6/0051; G02B 6/0068; G02B 6/0028; G02B 6/0055; G02B 2027/0118; G02B 27/0101; G02B 6/0016;
(Continued)

(56) References Cited

U.S. PATENT DOCUMENTS 5,899,552 A * 5/1999 Yokoyama ........... G02B 6/0038
349/62
6,480,307 B1 * 11/2002 Yang .................... G02B 5/0215
349/65
(Continued)

FOREIGN PATENT DOCUMENTS

JP 2008293114 A * 12/2008
KR 1020070037108 A 4/2007
(Continued)

*Primary Examiner* — Thien T Mai
(74) *Attorney, Agent, or Firm* — Cantor Colburn LLP

(57) ABSTRACT

A display panel includes a first substrate including a first base substrate and a pixel part, a second substrate disposed under the first substrate and including a second base substrate, which includes a side surface and an upper surface connected to the side surface, and a light exit direction control plate disposed between the second base substrate and the pixel part, and a light source part disposed to face the side surface of the second base substrate and which provides the side surface with a light. The second base substrate guides the light to allow the light to exit through the upper surface as a surface light source and the light exit direction control plate includes a light exit direction control groove to control an exit angle of the surface light source.

15 Claims, 12 Drawing Sheets

(58) Field of Classification Search
CPC .... G02B 6/0018; G02B 6/0021; G02B 6/003; G02B 6/0031; G02B 6/0033; G02B 6/0073; G02B 6/008; G02B 6/0083; G02B 5/3033
See application file for complete search history.

(56) References Cited

U.S. PATENT DOCUMENTS

| | | | |
|---|---|---|---|
| 2001/0053075 A1 | 12/2001 | Parker et al. | |
| 2002/0135996 A1* | 9/2002 | Suga | G02B 6/0038 362/601 |
| 2002/0141202 A1* | 10/2002 | Liu | G02B 6/0046 362/558 |
| 2006/0164860 A1* | 7/2006 | Muraoka | G02B 6/0056 362/607 |
| 2008/0130316 A1* | 6/2008 | Kinoshita | G02B 6/0038 362/620 |
| 2008/0137005 A1* | 6/2008 | Kim | G02B 6/0055 349/64 |
| 2009/0257001 A1* | 10/2009 | Sumida | G02B 6/0033 349/65 |
| 2010/0207964 A1* | 8/2010 | Kimmel | G02B 6/0036 345/690 |
| 2012/0127397 A1* | 5/2012 | Yamamoto | G02B 6/0038 349/62 |

FOREIGN PATENT DOCUMENTS

| | | |
|---|---|---|
| KR | 1020100073459 A | 7/2010 |
| KR | 1020110022970 A | 3/2011 |
| KR | 1020110118389 A | 10/2011 |
| KR | 1020120026880 A | 3/2012 |
| KR | 1020130051133 A | 5/2013 |
| KR | 1020130129008 A | 11/2013 |

* cited by examiner

DISPLAY PANEL AND METHOD OF MANUFACTURING THE SAME

This application claims priority to Korean Patent Application No. 10-2015-0063310, filed on May 6, 2015, and all the benefits accruing therefrom under 35 U.S.C. § 119, the content of which in its entirety is herein incorporated by reference.

BACKGROUND

1. Field

The disclosure relates to a display device and a method of manufacturing the display device. More particularly, the disclosure relates to a flexible display panel and a method of manufacturing the flexible display panel.

2. Description of the Related Art

In general, a flat panel display device is widely used due to advantages thereof, such as a large size, a light weight, etc. As the flat panel display device, a liquid crystal display device is broadly used. In particular, a flexible liquid crystal display device having a thin thickness and being curved is desired for the display industry.

SUMMARY

The disclosure provides a flexible liquid crystal display panel having thin thickness and being curved.

The disclosure provides a method of manufacturing the flexible liquid crystal display panel.

Embodiments of the inventive concept provide a display panel including a first substrate including a first base substrate and a pixel part, a second substrate disposed under the first substrate and including a second base substrate and a light exit direction control plate disposed between the second base substrate and the pixel part, where the second base substrate includes a side surface and an upper surface connected to the side surface, and a light source part disposed to face the side surface of the second base substrate, where the light source part emits light to the side surface of the second base substrate. In such an embodiment, the second base substrate guides the light to allow the light to exit through the upper surface as a surface light source, and the light exit direction control plate includes a light exit direction control groove to control an exit angle of the surface light source.

Embodiments of the inventive concept provide a method of manufacturing a display panel, including forming a first substrate and forming a second substrate. In such an embodiment, the forming the second substrate includes providing a second base substrate, providing a first sacrificial layer on a lower surface of the second base substrate, providing a second sacrificial layer on an upper surface of the second base substrate, removing a portion of the first sacrificial layer to form a first cavity, and removing a portion of the second sacrificial layer to form a second cavity.

According to embodiments of the inventive concept, the display panel includes a lower substrate including the second base substrate that performs a function of a conventional light guide plate. Therefore, the thickness of the display panel may be reduced and the display panel may have the flexibility. In addition, a light efficiency and a front brightness of the display panel are improved by the light exit direction control plate of the lower substrate, and distribution of exit angle may be effectively controlled. Further, the first and second substrate may be manufactured by using a process line for a conventional liquid crystal display in the viewpoint of process.

BRIEF DESCRIPTION OF THE DRAWINGS

The above and other features of the invention will become readily apparent by reference to the following detailed description when considered in conjunction with the accompanying drawings, in which.

DETAILED DESCRIPTION

Figure 1:
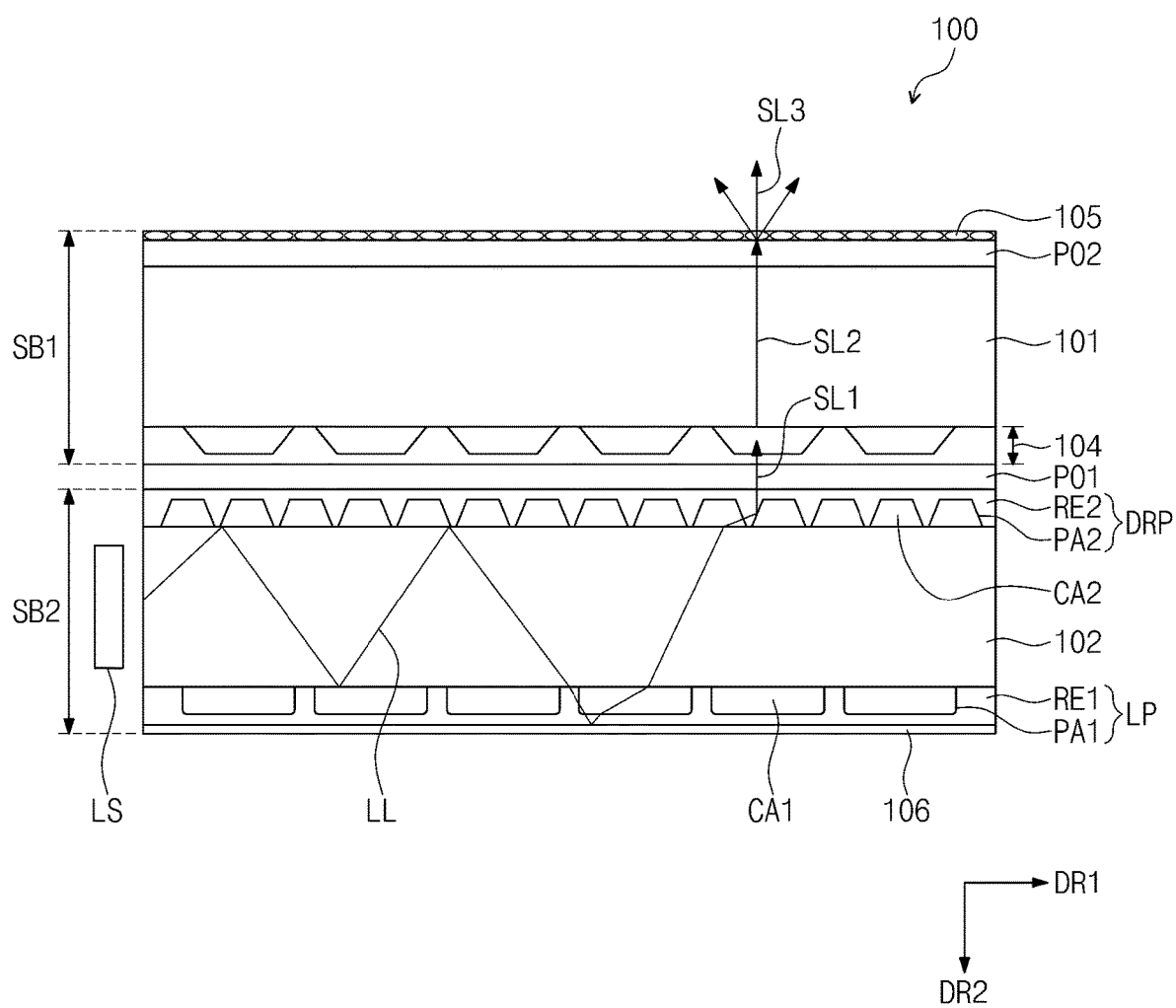
FIG. 1 is a cross-sectional view showing a display panel according to an exemplary embodiment of the invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be explained in detail with reference to the accompanying drawings.

FIG. 1 is a cross-sectional view showing a display panel 100 according to an exemplary embodiment of the invention.

Referring to FIG. 1, an exemplary embodiment of the display panel 100 includes a first substrate SB1, a first polarizing plate PO1 and a second substrate SB2.

The second substrate SB2 includes a light exit direction control plate DRP, a light exit plate LP, a second base substrate 102, a reflective film 106, and a light source LS.

The light source LS is disposed adjacent to a side surface of the second base substrate 102. The light source LS emits source light LL to the side surface of the second base substrate 102. In an exemplary embodiment, the source light LL may be, but not limited to, a white light. In such an embodiment, the light source LS includes a white light emitting diode that emits the white light.

The second base substrate 102 is disposed adjacent to the light source LS in a first direction DR1. The second base substrate 102 receives the source light LL from the light source LS and reflects the source light LL by the total reflection therein to guide the source light LL to the first direction DR1.

The light exit plate LP is disposed under the second base substrate 102. In one exemplary embodiment, for example, the light exit plate LP may be attached to a lower surface of the second base substrate 102. The light exit plate LP includes a first pattern groove PA1 and a resin layer RE1. The first pattern groove PA1 and the lower surface of the second base substrate 102 define a first cavity CA1. In an exemplary embodiment, the light exit plate LP includes a plurality of first cavities CA1, and the first cavities CA1 may be arranged in the first direction DR1.

The first cavity CA1 controls the source light LL guided inside the second base substrate 102 to allow the source light LL to exit through an upper portion of the second base substrate 102 as a first light SL1. The first cavity CA1 refracts or scatters the source light LL guided inside the second base substrate 102.

The light exit direction control plate DRP is disposed on an upper surface of the second base substrate 102. In one exemplary embodiment, for example, the light exit direction control plate DRP may be attached to the upper surface of the second base substrate 102.

The light exit direction control plate DRP includes a second pattern groove PA2 and a second resin layer RE2. The second pattern groove PA2 and the upper surface of the second base substrate 102 define a second cavity CA2. In an exemplary embodiment, the light exit direction control plate DRP includes a plurality of second cavities CA2, and the second cavities CA2 may be arranged in the first direction DR1.

The second cavity CA2 controls an exit angle of the first light SL1. The second cavity CA2 will be described later in greater detail with reference to FIG. 2.

The first polarizing plate PO1 is disposed between the first and second substrates SB1 and SB2. The first polarizing plate PO1 has a first polarizing axis (not shown). The first polarizing plate PO1 polarizes the first light SL1 incident thereto in a direction substantially parallel to the first polarizing axis.

The reflective film 106 is disposed under the first resin layer RE1 to face the second base substrate 102. In one exemplary embodiment, for example, the reflective film 106 is attached to a lower surface of the first resin layer RE1. The reflective film 106 reflects the light leaked downward from the second base substrate 102 to the second base substrate 102.

The first substrate SB1 includes a diffusion layer 105, a second polarizing plate PO2, a first base substrate 101, and a pixel part 104.

The pixel part 104 receives the first light SL1 polarized by the first polarizing plate PO1 and generates a second light SL2 using the first light SL1. This will be described later in greater detail with reference to FIG. 2.

The first base substrate 101 receives the second light SL2. The second light SL2 travels along a second direction DR2 inside the first base substrate 101 and exits through an upper surface of the first base substrate 101.

The second polarizing plate PO2 is disposed above the first base substrate 101. In one exemplary embodiment, for example, the second polarizing plate PO2 is attached to an upper surface of the first base substrate 101. The second polarizing plate PO2 has a second polarizing axis (not shown). The second polarizing plate PO2 polarizes the second light SL2 incident thereto in a direction substantially parallel to the second polarizing axis. The first polarizing axis is substantially vertical to the second polarizing axis.

The second light SL2 exiting upward from the first base substrate 101 is provided to the diffusion layer 105 after being polarized by the second polarizing plate PO2.

The diffusion layer 105 is disposed above the second polarizing plate PO2. In one exemplary embodiment, for example, the diffusion layer 105 is attached to an upper surface of the second polarizing plate PO2.

The diffusion layer 105 diffuses the second light SL2 incident thereto and emits the diffused second light SL2 as a third light SL3 traveling upward.

Figure 2:
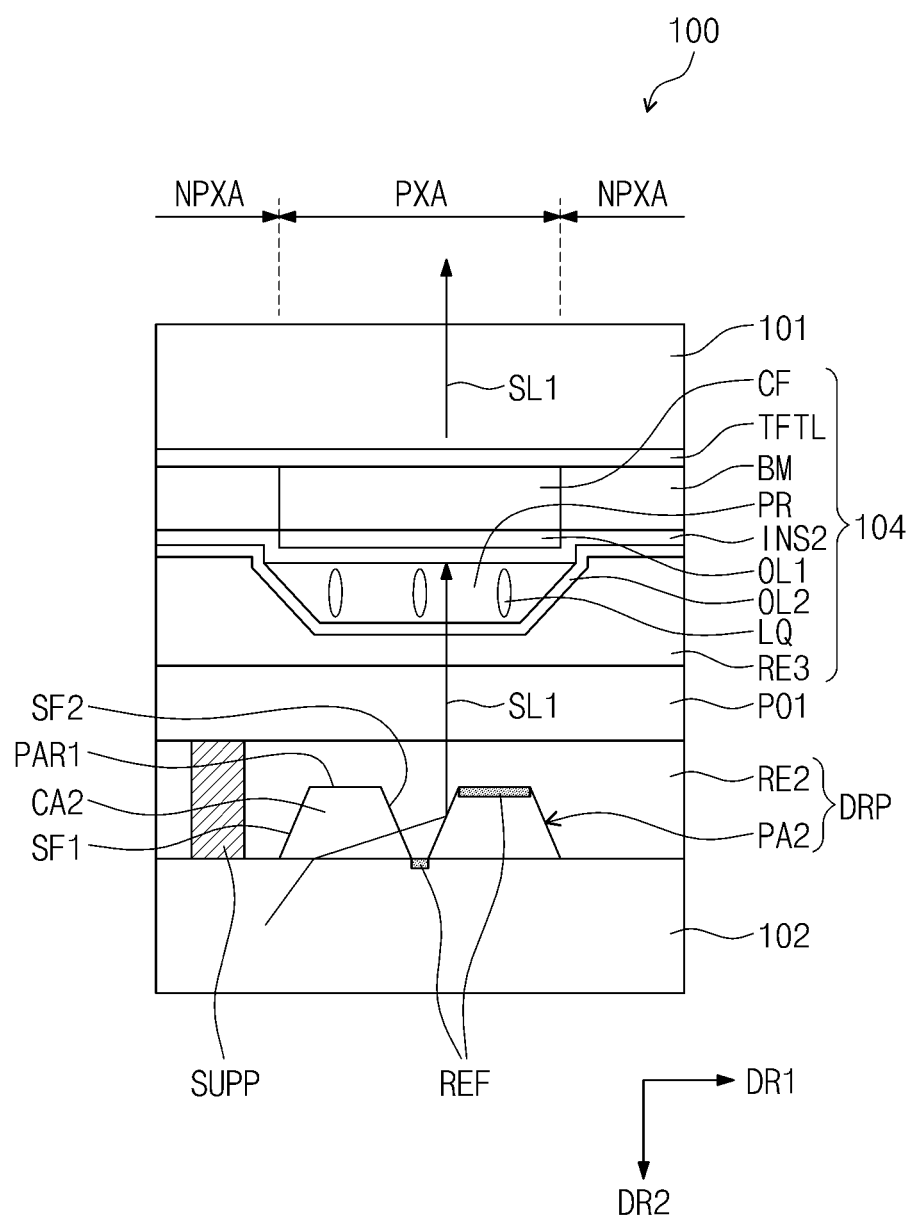
FIG. 2 is an enlarged cross-sectional view showing a portion of a display panel according to an exemplary embodiment of the invention.

FIG. 2 is an enlarged cross-sectional view showing a portion of the display panel 100 shown in FIG. 1.

Referring to FIG. 2, the pixel part 104 includes a first electrode OL1, a second electrode OL2, a thin film transistor layer TFTL, a second insulating layer INS2, a third resin layer RE3, a liquid crystal layer LQ, a pixel groove PR, a color filter CF, and a black matrix BM. In such an embodiment, the display panel 100 includes a plurality of pixel parts 104 corresponding to a plurality of pixel thereof, respectively. The pixel parts 104 may have substantially the same structure as each other. For convenience of illustration, FIG. 2 shows only a pixel part 104 corresponding to one pixel, and any repetitive detailed description of the pixel part 104 corresponding to other pixels will be omitted.

The display panel 100 includes a pixel area PXA and a non-pixel area NPXA, which are defined therein. The pixel part 104 is disposed to correspond to the pixel area PXA.

A first insulation layer (not shown) is disposed under the first base substrate 101. In one exemplary embodiment, for example, the first insulating layer (not shown) is attached to the lower surface of the first base substrate 101. The first insulating layer (not shown) includes an inorganic insulating material or an organic insulating material.

The pixel part 104 includes the thin film transistor layer TFTL including a line part (not shown) for transmitting signals and a thin film transistor for driving the pixel part 104.

The thin film transistor layer TFTL is disposed between the first base substrate 101 and the pixel part 104. The thin film transistor is connected to the line part (not shown) and includes a gate electrode, a semiconductor layer, a source electrode and a drain electrode.

The color filter CF and the black matrix BM are disposed between the thin film transistor layer TFTL and the pixel part 104.

The black matrix BM is disposed between adjacent pixels or pixel areas to block the light that is not used to display the image. The black matrix BM effectively prevents light leakage caused by malfunction of liquid crystal molecules in boundaries between the pixel areas, in which the image is displayed, or color mixture that may occurs at edges of or boundaries between the color filters CF. The black matrix BM is disposed adjacent to a side portion of the color filter CF. In one exemplary embodiment, for example, the black matrix BM is provided to surround the color filter CF. In an exemplary embodiment, the color filter CF and the black matrix BM overlap each other in an area adjacent to a boundary of the pixel and non-pixel areas PXA and NPXA.

The first electrode OL1 is disposed under the color filter CF to correspond to the pixel area PXA. The first electrode OL1 is connected to the thin film transistor layer TFTL. In one exemplary embodiment, for example, the first electrode OL1 is electrically connected to the drain electrode of the thin film transistor layer TFTL through a contact hole (not shown) defined through the color filter CF.

The second insulating layer INS2 is disposed under the first electrode OL1 to cover a lower surface of the first electrode OL1. The second insulating layer INS2 includes an inorganic insulating material or an organic insulating material. The first electrode OL1 is insulated from the second electrode OL2 by the second insulating layer INS2. The first electrode OL1 receives a data voltage from the thin film transistor layer TFTL.

The third resin layer RE3 includes the pixel groove PR corresponding to the pixel area PXA, which is defined by a recessed portion of the third resin layer RE3, which is recessed downward from an upper surface of the third resin layer RE3.

The second electrode OL2 is disposed on the upper surface of the third resin layer RE3. In one exemplary embodiment, for example, the second electrode OL2 is disposed between the third resin layer RE3 and the second insulating layer INS2, and between the pixel groove PR and the liquid crystal layer LQ. The second electrode OL2 is connected to a common voltage line (not shown) and receives a common voltage through the common voltage line.

Each of the first and second electrodes OL1 and OL2 includes a transparent conductive material or a non-transparent conductive material, e.g., a metal. In such an embodiment, each of the first and second electrodes OL1 and OL2 may be transparent or non-transparent according to an operation mode of the display panel.

The liquid crystal layer LQ is disposed in the pixel groove PR between the second insulating layer INS2 and the second electrode OL2 facing the second insulating layer INS2. The liquid crystal layer LQ includes the liquid crystal molecules. The liquid crystal molecules of the liquid crystal layer LQ are controlled by an electric field generated based on a voltage difference between the data voltage applied to the first electrode OL1 and the common voltage applied to the second electrode OL2.

In an exemplary embodiment, as described above, the light exit direction control plate DRP includes the second resin layer RE2 and the second pattern groove PA2. In one exemplary embodiment, for example, the second pattern groove PA2 has substantially a trapezoid shape when viewed from a cross-sectional view.

In an exemplary embodiment, the second pattern groove PA2 is recessed from the lower surface of the light exit direction control plate DRP to the upper surface of the light exit direction control plate DRP and includes a first side surface SF1 extending from the lower surface of the light exit direction control plate DRP, a second side surface SF2 facing the first side surface SF1, and a first parallel surface PAR1 connected to the first and second surfaces SF1 and SF2 and substantially parallel to the upper surface of the second base substrate 102. The first and second side surfaces SF1 and SF2 are inclined with respect to the lower surface of the light exit direction control plate DRP.

The light exit direction control plate DRP may further include a reflective layer REF. In one exemplary embodiment, for example, the reflective layer REF is attached to the first parallel surface PAR1. In such an embodiment, the reflective layer REF may be attached to the lower surface of the second resin layer RE2 corresponding to the second cavities CA2.

The reflective layer REF reflects the source light LL incident thereto back to the second base substrate 102. The reflective layer REF allows the source light LL that is not incident to the first side surface SF1 to be recycled.

The light exit direction control plate DRP includes a support member SUPP disposed therein. The support member SUPP is disposed between a lower portion of the first polarizing plate PO1 and an upper portion of the second base substrate 102. In one exemplary embodiment, for example, the support member SUPP is attached to the lower surface of the first polarizing plate PO1 and the upper surface of the second base substrate 102 to connect the lower surface of the first polarizing plate PO1 and the upper surface of the second base substrate 102. The support member SUPP supports the light exit direction control plate DRP to effectively prevent the light exit direction control plate DRP from being deformed due to external pressure.

The light exit direction control plate DRP controls an exit direction of the source light LL to allow the source light LL to exit along a predetermined light exit path.

The predetermined light exit path may include paths, through which the source light LL is refracted by the second cavities CA2, the refracted first light SL1 passes through the second side surface SF2, and the first light SL1 exiting from the second side surface SF2 is guided to the first side surface SF1 in the second resin layer RE2, and the guided first light SL1 is reflected by the first side surface SF1 to control the light exit direction.

Accordingly, in such an embodiment, the light exit direction (or an exit angle) of the source light LL is controlled by the first side surface SF1, such that the first light SL1 may be uniformly provided to the pixel part 104.

The second cavities CA2 are defined in the pixel area PA to be aligned with the pixel part 104. In one exemplary embodiment, for example, two second cavities CA2 may be disposed in each pixel area PXA. In such an embodiment, as described above, the second cavities CA2 are disposed to be aligned with the pixel part 104, such that light efficiency is improved.

As described above, the display panel according to the exemplary embodiments includes the second substrate SB2 including the second base substrate 102 that functions as a light guide plate. Therefore, a separate light guide plate may be omitted from the display panel, and thus the thickness of the display device including the display panel 100 may be substantially reduced, and the display device may have a flexibility high enough to be used as a display panel of a flexible display device.

In such embodiments, the exit angle of the source light LL exiting through the light exit plate LP, which is random, may be controlled by the light exit direction control plate DRP to have a uniform exit angle. In such an embodiment, the light exit direction control plate DRP may uniformly provide the light to the pixel part 104. Accordingly, in such embodiments, the light efficiency and the front brightness of the display panel 100 are improved and distribution of the exit angle of the display panel 100 may be effectively controlled.

Figure 3:
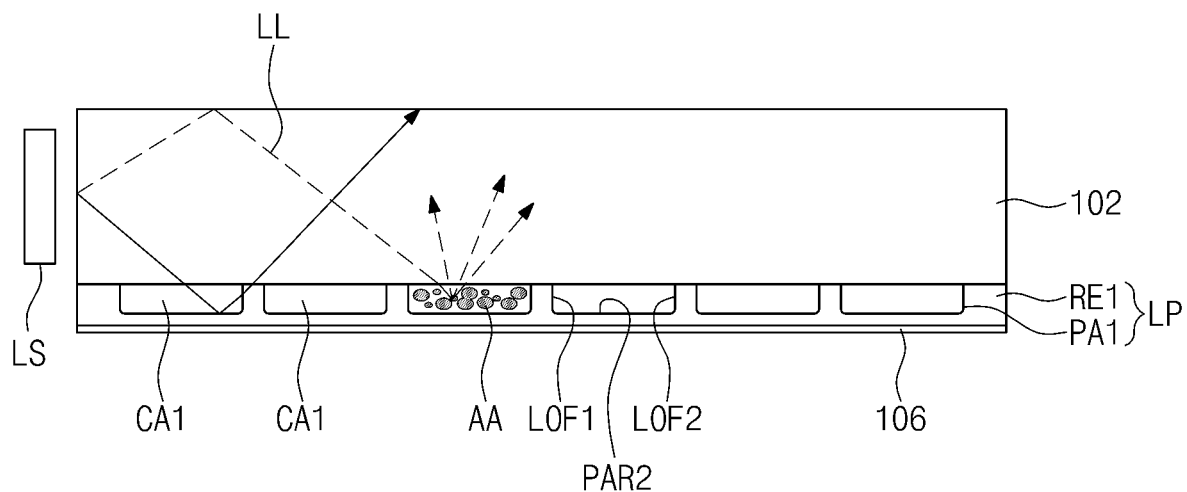
FIG. 3 is a cross-sectional view showing a portion of a second substrate shown in FIG. 1.

FIG. 3 is a cross-sectional view showing a portion of the second substrate SB2 shown in FIG. 1.

Referring to FIG. 3, the light exit plate LP of the second substrate SB2 includes the first resin layer RE1 and the first pattern groove PA1.

The first pattern groove PA1 has substantially a rectangular shape when viewed from a cross-sectional view. In an exemplary embodiment, the first pattern groove PA1 is recessed from the upper surface of the light exit plate LP to the lower surface of the light exit plate LP. The first pattern groove PA1 includes a first light exit side surface LOF1 substantially vertical to the upper surface of the first resin layer RE1, a second light exit side surface LOF2 facing the first light exit side surface LOF1, and a second parallel surface PAR2 extending from the first light exit side surface LOF1 to be substantially parallel to the upper surface of the first resin layer RE1 and connecting the first and second light exit side surfaces LOF1 and LOF2.

Scatters AA are disposed in the first cavities CA1. The scatters AA scatter the light incident thereto.

The light exit plate LP disturbs the total reflection condition of the source light LL guided by the second base substrate 102 to allow the source light LL to travel to the light exit direction control plate DRP. The light exit plate LP refracts, reflects, or scatters the source light LL.

The source light LL may travel along various optical paths by the light exit plate LP. In one exemplary embodiment, for example, the source light LL exits by the first and second light exit side surfaces LOF1 and LOF2 or exits after being scattered by the scatters AA. In one exemplary embodiment, for example, the reflective film 106 is attached to the lower surface of the light exit plate LP. The reflective film 106 allows the light traveling in directions different from a target optical path to be recycled.

Figure 4:
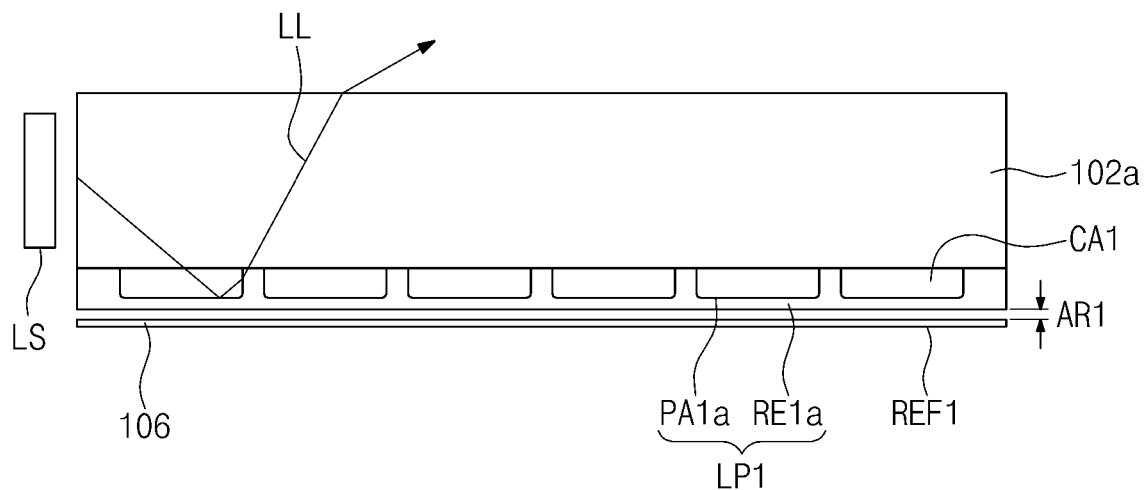
FIG. 4 is a cross-sectional view showing a portion of a second substrate according to another exemplary embodiment of the invention.

FIG. 4 is a cross-sectional view showing a portion of a second substrate according to another exemplary embodiment of the invention.

Referring to FIG. 4, the light exit plate LP1 includes the first resin layer RE1*a* and the first pattern groove PA1*a*. A first reflective plate REF1 is disposed under a light exit plate LP1 and spaced apart from the light exit plate LP1 by a predetermined distance AR1. The first reflective plate REF1 reflects the source light LL to recycle a portion of the source light LL, which does not exit through an upper surface of the second base substrate 102*a*. The first distance AR1 is variously determined based on the portion of the source light LL, which does not exit through the upper surface of the second base substrate 102*a*. In such an embodiment, the second substrate SB2 has substantially the same structure and function as those of the second substrate 102 shown in FIG. 3 except for the first reflective plate REF1 and the light exit plate LP1, and any repetitive detailed description of other elements of the second substrate SB2 except for the first reflective plate REF1 and the light exit plate LP1 will be omitted.

Figure 5:
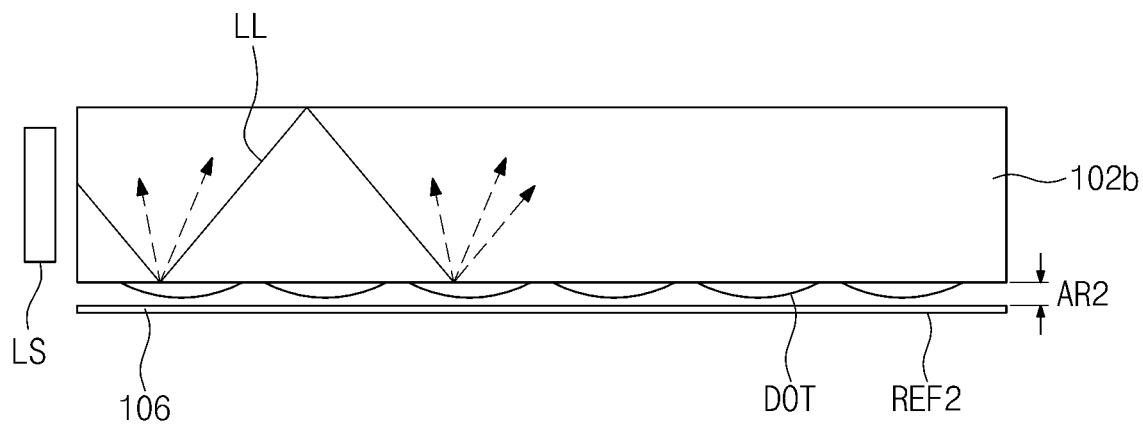
FIG. 5 is a cross-sectional view showing a portion of a second substrate according to another exemplary embodiment of the invention.

FIG. 5 is a cross-sectional view showing a portion of a second substrate according to another exemplary embodiment of the invention.

Referring to FIG. 5, in an alternative exemplary embodiment, a second substrate 102*b* includes light exit protrusions DOT to replace the light exit plate LP1 shown in FIG. 4. The light exit protrusions DOT are protruded downward from a lower surface of the second base substrate 102*b*. Each of the light exit protrusions DOT has a convex shape protruded downward from the second base substrate 102*b*.

The source light LL guided by the second base substrate 102*b* exits from the second base substrate 102*b* after being refracted by the light exit protrusions DOT.

Figure 6:
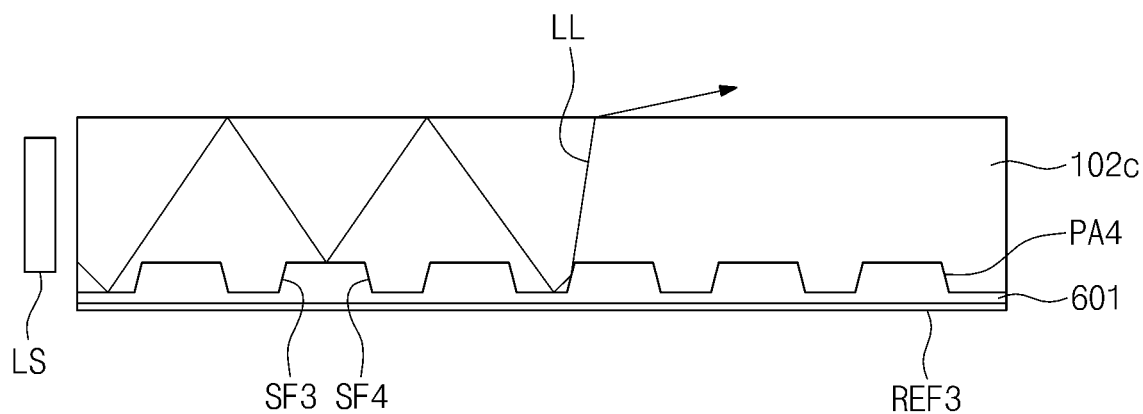
FIG. 6 is a cross-sectional view showing a portion of a second substrate according to another exemplary embodiment of the invention.

FIG. 6 is a cross-sectional view showing a portion of a second substrate according to another exemplary embodiment of the invention.

Referring to FIG. 6, in another alternative exemplary embodiment, a second base substrate 102*c* includes a fourth pattern groove PA4. The second base substrate 102*c* serves as a function of the light exit plate LP1 described above with reference to FIG. 4.

The fourth pattern groove PA4 has substantially a trapezoid shape when viewed from a cross-sectional view. In such an embodiment, the fourth pattern groove PA4 is recessed from a lower surface of the second base substrate 102c to an upper surface of the second base substrate 102c and includes a third side surface SF3 extending from the lower surface of the second base substrate 102c and a fourth side surface SF4 extending from the lower surface of the second base substrate 102c to face the third side surface SF3. The third and fourth side surfaces SF3 and SF4 are inclined with respect to the lower surface of the second base substrate 102c.

The source light LL guided by the second base substrate 102c exits through the upper surface of the second base substrate 102c after being reflected by the fourth pattern groove PA4.

A refractive plate 601 may be disposed under the lower surface of the second base substrate 102c. In one exemplary embodiment, for example, the refractive plate 601 may be attached to the lower surface of the second base substrate 102c.

The refractive plate 601 includes a light refractive material having a low refractive index.

The source light LL is reflected by the fourth pattern groove PA4 to allow the source light LL guided by the second base substrate 102c to exit through the upper surface of the second base substrate 102c. In addition, the source light LL is refracted by the refractive plate 601 while passing through the refractive plate 601 and reflected by a third reflective plate REF3 to be incident into the second base substrate 102c again.

The third reflective plate REF3 is disposed under the refractive plate 601. In one exemplary embodiment, for example, the third reflective plate REF3 is attached to a lower surface of the refractive plate 601. In an exemplary embodiment, the second substrate has the same structure and function as those of the second substrate shown in FIG. 4 except for the second base substrate 102c and the third reflective plate REF3, and any repetitive detailed description of other elements of the second substrate will be omitted. In an alternative exemplary embodiment, the refractive plate 601 may be omitted.

Figure 7:
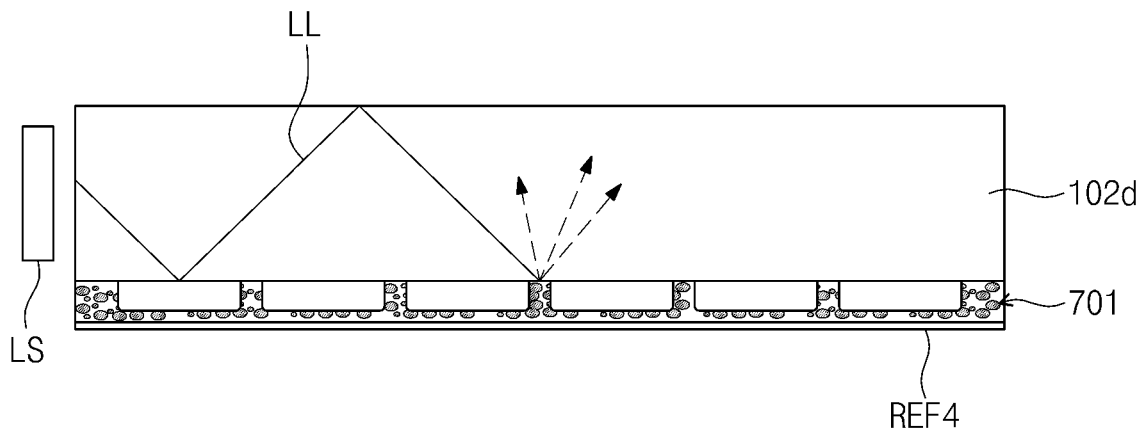
FIG. 7 is a cross-sectional view showing a portion of a second substrate according to another exemplary embodiment of the invention.

FIG. 7 is a cross-sectional view showing a portion of a second substrate according to another exemplary embodiment of the invention.

Referring to FIG. 7, in an alternative exemplary embodiment, a scattering layer 701 defined by a scattering material injected into the first resin layer RE1 is used instead of the first resin layer RE1. In such an embodiment, the second substrate has substantially the same structure and function as those of the second substrate shown in FIG. 4 except for the scattering layer 701, and any repetitive detailed descriptions of other elements of the second substrate will be omitted.

The source light LL guided by the second base substrate 102d is scattered by the scattering layer 701. The scattering degree of the source light LL is determined depending on an amount of the scattering material.

Figure 8:
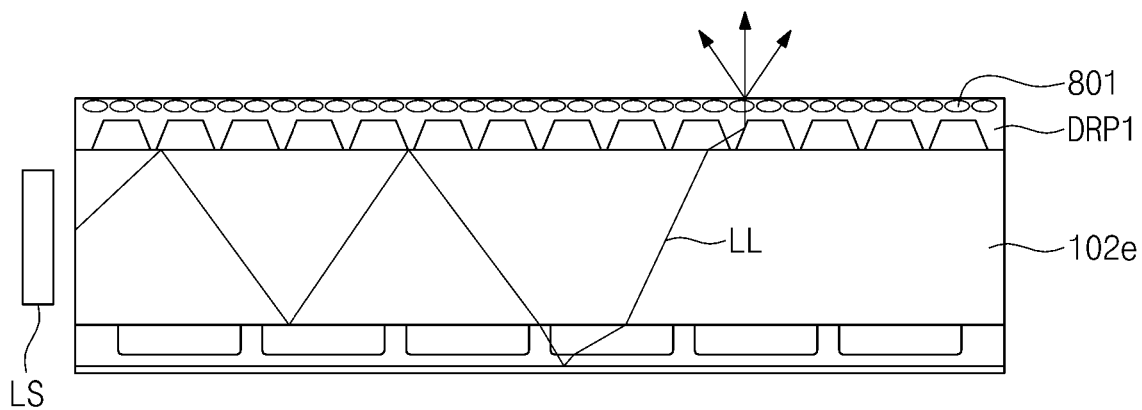
FIG. 8 is a cross-sectional view showing a portion of a second substrate according to another exemplary embodiment of the invention.

FIG. 8 is a cross-sectional view showing a portion of a second substrate according to another exemplary embodiment of the invention.

Referring to FIG. 8, in an alternative exemplary embodiment, a diffusion layer 801 is disposed on an upper surface of a light exit direction control plate DRP1. In an exemplary embodiment, the diffusion layer 801 is attached to the upper surface of the light exit direction control plate DRP1. The diffusion layer 801 improves uniformity of brightness. In such an embodiment, the second substrate has substantially the same structure and function as those of the second substrate shown in FIG. 1 except for the light exit direction control plate DRP1 and the diffusion layer 801, and any repetitive detailed descriptions of other elements of the second substrate will be omitted.

Figure 9:
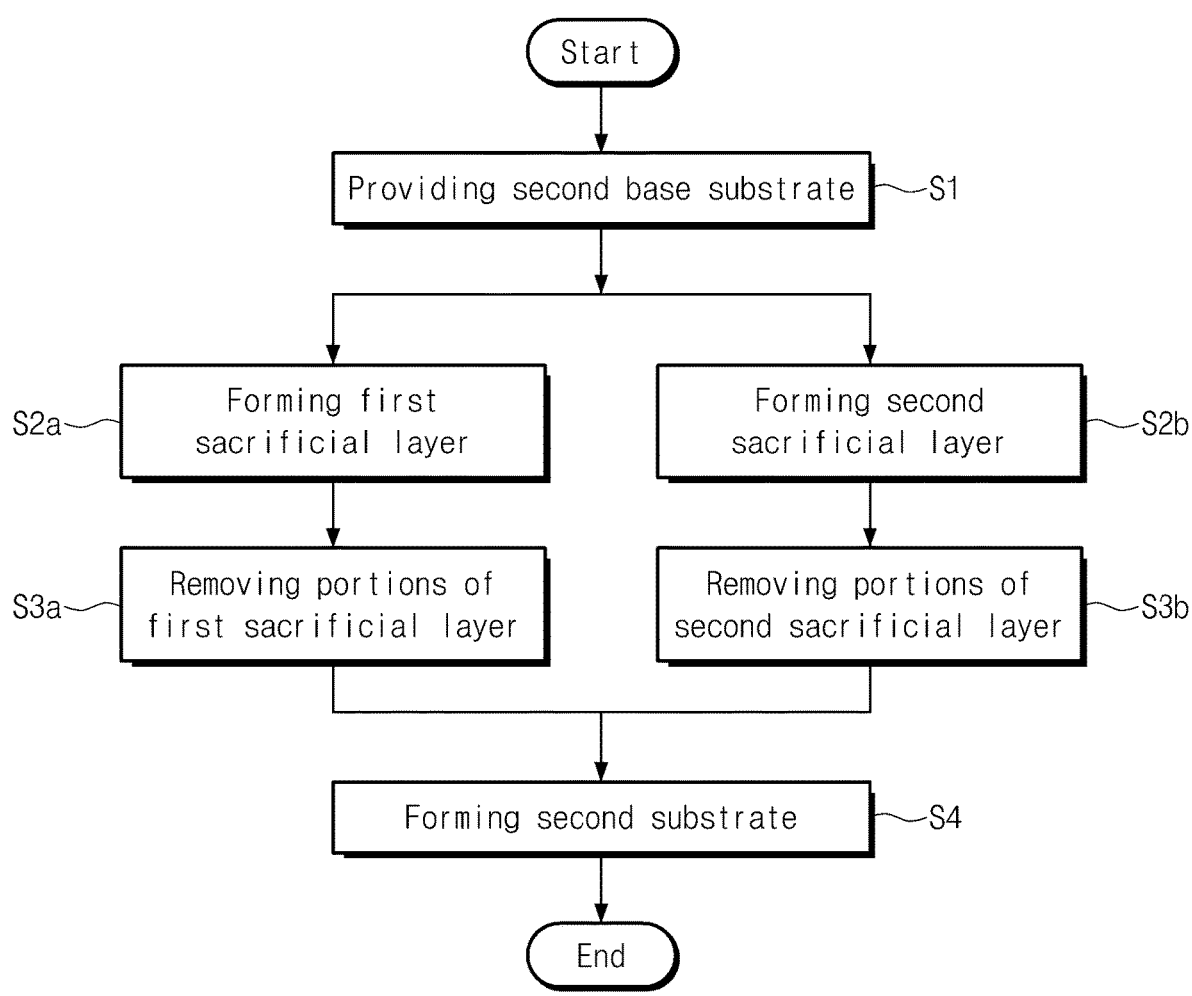
FIG. 9 is a flowchart showing a method of manufacturing a second substrate of a display panel according to an exemplary embodiment of the invention.
Figure 10:
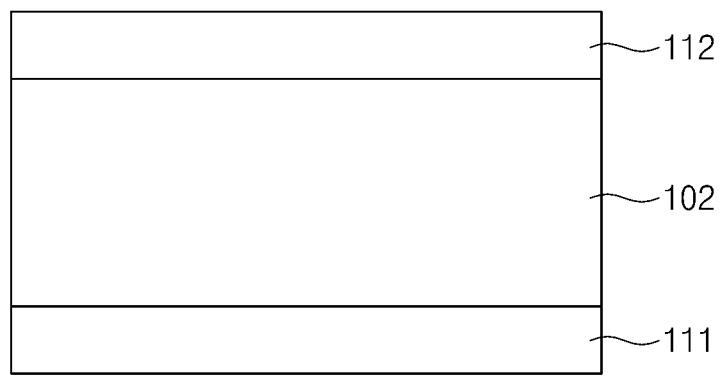
FIG. 10 is a cross-sectional view showing a process of forming of first and second sacrificial layers in FIG. 9.
Figure 11:
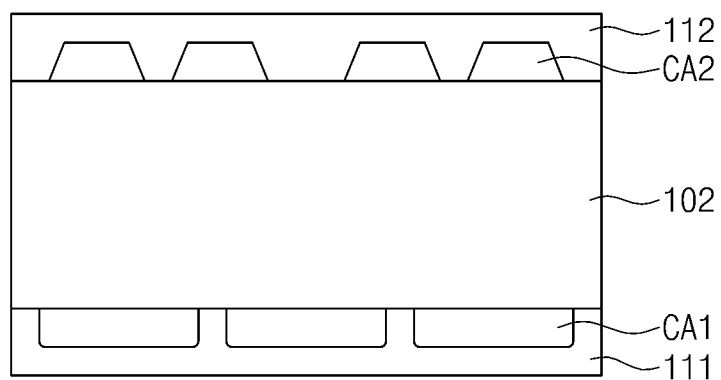
FIG. 11 is a cross-sectional view showing a process of removing of portions of the first and second sacrificial layers in FIG. 9.

FIG. 9 is a flowchart showing a method of manufacturing a second substrate of a display panel according to an exemplary embodiment of the invention, FIG. 10 is a cross-sectional view showing a process of forming of first and second sacrificial layers in FIG. 9, and FIG. 11 is a cross-sectional view showing a process of removing of portions of the first and second sacrificial layers in FIG. 9.

Referring to FIGS. 9, 10 and 11, to manufacture the second substrate SB2 of the display panel, the second base substrate 102 is provided (S1). Then, a first sacrificial layer 111 and a second sacrificial layer 112 are respectively provided or formed on the lower surface and the upper surface of the second base substrate 102 (S2a and S2b). In such an embodiment, the first sacrificial layer 111 may be attached to the lower surface of the second base substrate 102 and the second sacrificial layer 112 may be attached to the upper surface of the second base substrate 102. The first and second sacrificial layers 111 and 112 are partially removed (S3a and S3b). When the first sacrificial layer 111 is partially removed, the second base substrate 102 and the first sacrificial 111 form the first cavity CA1, and when the second sacrificial layer 112 is partially removed, the second base substrate 102 and the second sacrificial 112 form the second cavity CA2, thereby forming the second substrate SB2 (S4).

Figure 12:
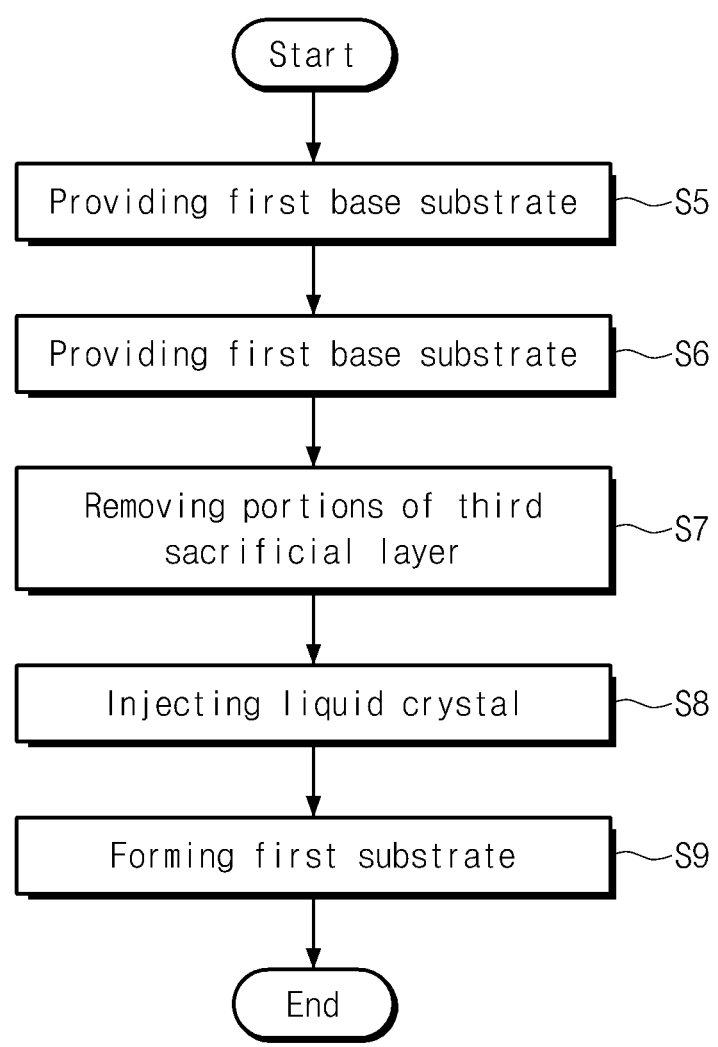
FIG. 12 is a flowchart showing a method of manufacturing a first substrate of a display panel according to an exemplary embodiment of the invention.
Figure 13:
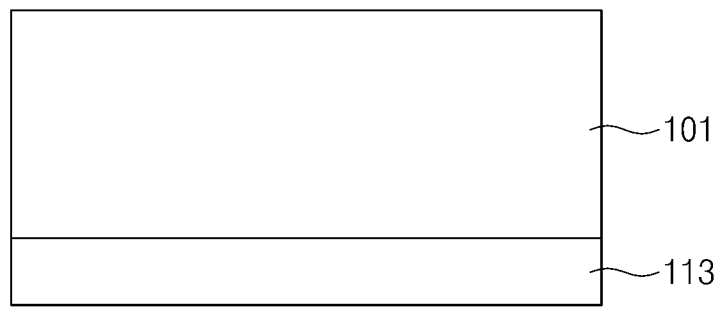
FIG. 13 is a cross-sectional view showing a process of forming of a third sacrificial layer in FIG. 12.
Figure 14:
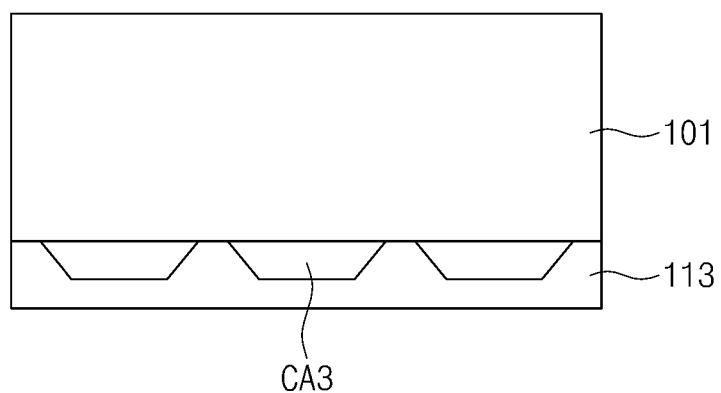
FIG. 14 is a cross-sectional view showing a process of removing of a portion of the third sacrificial layer in FIG. 12.
Figure 15:
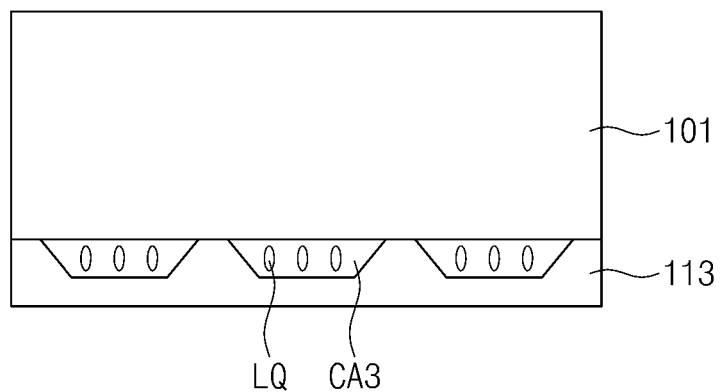
FIG. 15 is a cross-sectional view showing a process of injecting of liquid crystals in FIG. 12.

FIG. 12 is a flowchart showing a method of manufacturing a first substrate of a display panel according to an exemplary embodiment of the invention, FIG. 13 is a cross-sectional view showing forming of a third sacrificial layer in FIG. 12, FIG. 14 is a cross-sectional view showing removing of a portion of the third sacrificial layer in FIG. 12, and FIG. 15 is a cross-sectional view showing injecting of liquid crystals in FIG. 12.

Referring to FIGS. 12, 13, 14 and 15, to manufacture the first substrate SB1 of the display panel, the first base substrate 101 is provided (S1). Then, the thin film transistor layer, the color filter and the black matrix are provided or formed on the lower surface of the first base substrate 101. Then, the first electrode is provided or formed on the lower surface of the color filter, and the second electrode and the cover layer are provided or formed after the third sacrificial layer 113 is formed (S3). The third sacrificial layer 113 is partially removed (S7). When the third sacrificial layer 113 is partially removed, the first base substrate 101 and the third sacrificial layer 113 form the third cavity CA3. Then, the liquid crystals are injected into the third cavity CA3 to form a layer through which the image is displayed (S8). Then, a sealing layer (not shown) may be provided or formed to seal the layer through which the image is displayed, thereby forming the first substrate SB1 (S9).

Figure 16:
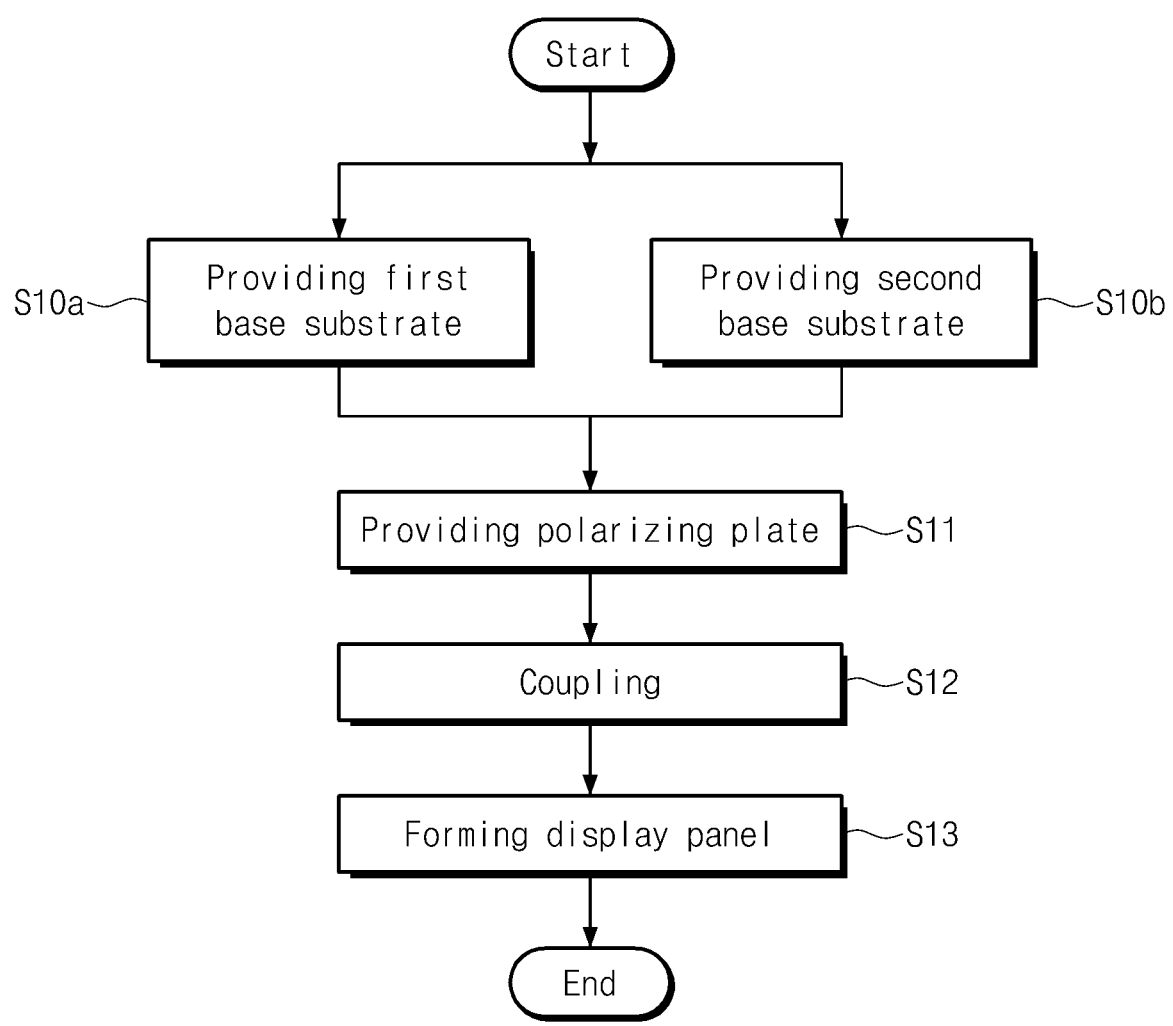
FIG. 16 is a flowchart showing a method of manufacturing a display panel according to an exemplary embodiment of the invention.
Figure 17:
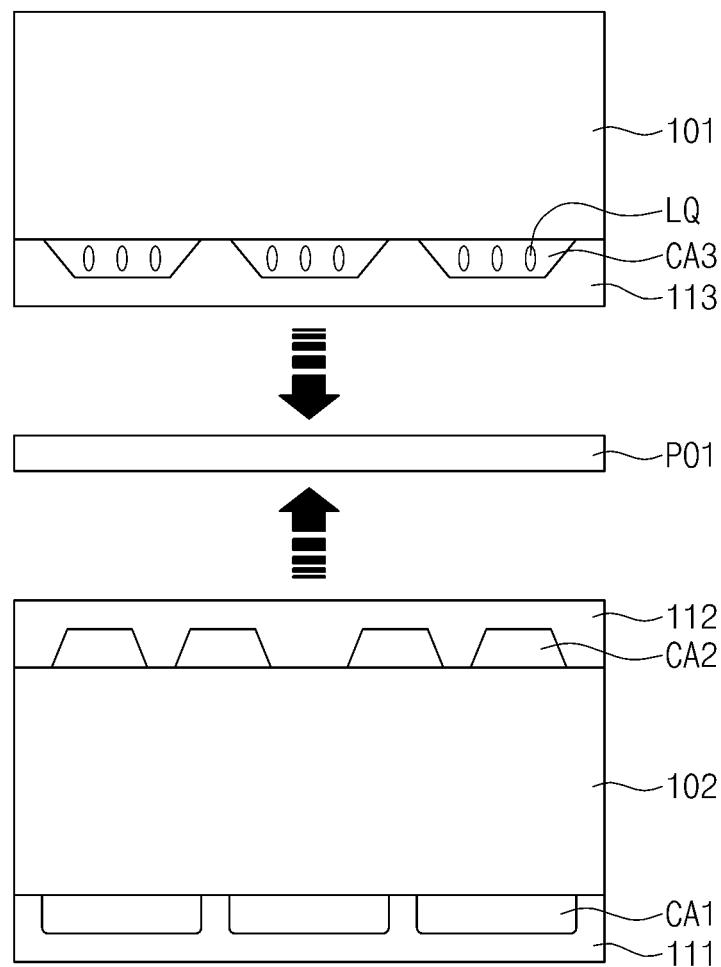
FIG. 17 is a cross-sectional view showing a process of assembling of first and second substrates in FIG. 16.

FIG. 16 is a flowchart showing a method of manufacturing a display panel according to an exemplary embodiment of the invention and FIG. 17 is a cross-sectional view showing assembling of first and second substrates in FIG. 16.

Referring to FIGS. 16 and 17, the second substrate SB2 manufactured by the method shown in FIG. 10 and the first substrate SB1 manufacture by the method shown in FIG. 13 are provided S10a and S10b to manufacture the display panel 100. Then, the first polarizing plate PO1 is provided. The first substrate SB1 and the second substrate SB2 are coupled to each other (S12) such that the first polarizing plate PO1 is disposed between the first and second substrates SB1 and SB2, and thus the display panel 100 is manufactured (S13). In such an embodiment, as described above, manufacturing or forming the first substrate S10a may include providing a first base substrate, providing a color filter and a black matrix on a lower surface of the first base substrate, providing a first electrode on a lower surface of the color filter, providing a third sacrificial layer on a lower surface of the first electrode, providing a second electrode on the third sacrificial layer, providing a cover layer to cover the second electrode, removing a portion of the third sacrificial layer to define a third cavity between the first and second electrodes, providing an image display part in the third cavity, and providing a protective layer to cover the second electrode and to seal the third cavity. In such an embodiment, as described above, manufacturing or forming the second substrate S10b may include providing a second base substrate, providing a first sacrificial layer on a lower surface of the second base substrate, providing a second sacrificial layer on an upper surface of the second base substrate, removing a portion of the first sacrificial layer to form a first cavity, and removing a portion of the second sacrificial layer to form a second cavity.

In exemplary embodiments of the invention, as described above, the display panel 100 may be manufactured using the process of removing the portions of the first to third sacrificial layers 111 to 113, and the first and second substrates SB1 and SB2 may be manufactured by using a process line for a conventional liquid crystal display in the viewpoint of process.

Although some exemplary embodiments of the invention have been described herein, it is understood that the invention should not be limited to these exemplary embodiments but various changes and modifications can be made by one ordinary skilled in the art within the spirit and scope of the invention as hereinafter claimed.

What is claimed is:

1. A display panel comprising:
   a first substrate comprising a first base substrate and a pixel part;
   a second substrate disposed under the first substrate and comprising a second base substrate and a light exit direction control plate disposed between the second base substrate and the pixel part and coupled to the second base substrate, wherein the second base substrate comprises a side surface and an upper surface connected to the side surface;
   a light source part disposed to face the side surface of the second base substrate, wherein the light source part emits light to the side surface of the second base substrate; and
   a polarizing plate disposed between the first substrate and the second substrate and coupled to the first and second substrates,
   wherein
   the second base substrate guides the light to allow the light to exit through an upper surface thereof as a surface light source, and
   the light exit direction control plate comprises a light exit direction control groove to control an exit angle of the surface light source.

2. The display panel of claim 1, wherein
   the light exit direction control groove is defined in a same layer defining the light exit direction control plate and is recessed from a lower surface defining the light exit direction control plate and recessed toward an upper surface defining the light exit direction control plate, and
   the light exit direction control groove and an upper surface of the second base substrate define a first cavity.

3. The display panel of claim 2, wherein the light exit direction control groove comprises a first side surface inclined with respect to the lower surface and extending from the lower surface.

4. The display panel of claim 3, wherein the light exit direction control groove comprises a second side surface inclined with respect to the lower surface, extending from the lower surface, and facing the first side surface.

5. The display panel of claim 2, wherein the second substrate further comprises:
   a resin layer disposed under the second base substrate; and
   a light exit plate comprising a light exit pattern groove, from which the light guided by the second base substrate exits,
   the light exit pattern groove is recessed from an upper surface of the resin layer to a lower surface of the resin layer, and
   the light exit pattern groove and a lower surface of the second base substrate define a second cavity.

6. The display panel of claim 5, wherein the light exit pattern groove comprises:
   a first light exit pattern surface substantially vertical to the upper surface of the resin layer; and
   a second light exit pattern surface extending from the first light exit pattern surface to be substantially parallel to the upper surface of the resin layer.

7. The display panel of claim 5, further comprising:
   a scattering material disposed in the second cavity.

8. The display panel of claim 5, wherein the resin layer comprises a scattering material.

9. The display panel of claim 5, wherein
   the second substrate further comprises a reflective plate disposed under the light exit plate, wherein the reflective plate reflects the light traveling thereto to the light exit plate, and
   the reflective plate is spaced apart from the light exit plate by a predetermined distance.

10. The display panel of claim 2, wherein
    the second substrate further comprises a reflective plate comprising a reflective surface,
    the second base substrate further comprises a light exit pattern groove,
    the reflective plate is disposed under the second base substrate, and
    the light exit pattern groove is recessed from the lower surface to the upper surface of the second base substrate.

11. The display panel of claim 2, wherein
    the second substrate further comprises:
    a reflective film comprising a reflective surface; and
    a refractive plate which refracts the light guided by the second base substrate,
    the second base substrate further comprises a light exit pattern groove,
    the reflective film is disposed under the second base substrate,
    the light exit pattern groove is recessed from the lower surface to the upper surface of the second base substrate, and
    the refractive plate is disposed between the second base substrate and the reflective film.

12. The display panel of claim 2, wherein
the first substrate further comprises a diffusion layer to diffuse the surface light source passing through the pixel part, and
the diffusion layer is disposed on the light exit direction control plate.

13. The display panel of claim 2, wherein
the second substrate further comprises a light exit protrusion protruded downward from the lower surface of the second base substrate, and
the light exit protrusion allows the light guided by the second base substrate to exit.

14. The display panel of claim 1, wherein the light exit direction control plate further comprises a reflective layer attached to a portion of the light exit direction control groove.

15. The display panel of claim 1, wherein the light exit direction control plate further comprises a support member disposed therein, wherein the support member disposed between a lower surface of the polarizing plate and an upper surface of the second base substrate.

* * * * *